US011934834B2

(12) United States Patent
Mirkes et al.

(10) Patent No.: US 11,934,834 B2
(45) Date of Patent: Mar. 19, 2024

(54) INSTRUCTION SCHEDULING IN A PROCESSOR USING OPERATION SOURCE PARENT TRACKING

(71) Applicant: Ampere Computing LLC, Santa Clara, CA (US)

(72) Inventors: Sean Philip Mirkes, Santa Clara, CA (US); Jason Anthony Bessette, Santa Clara, CA (US)

(73) Assignee: Ampere Computing LLC, Santa Clara, CA (US)

( * ) Notice: Subject to any disclaimer, the term of this patent is extended or adjusted under 35 U.S.C. 154(b) by 49 days.

(21) Appl. No.: 17/451,406

(22) Filed: Oct. 19, 2021

(65) Prior Publication Data
US 2023/0118428 A1 Apr. 20, 2023

(51) Int. Cl.
*G06F 9/38* (2018.01)
(52) U.S. Cl.
CPC .................... *G06F 9/3838* (2013.01)
(58) Field of Classification Search
CPC ...................................................... G06F 9/3838
See application file for complete search history.

(56) References Cited

U.S. PATENT DOCUMENTS

| | | | |
|---|---|---|---|
| 6,334,182 B2* | 12/2001 | Merchant | G06F 8/445 712/216 |
| 9,606,806 B2* | 3/2017 | Smaus | G06F 9/3842 |
| 11,036,514 B1* | 6/2021 | Reynolds | G06F 9/4881 |
| 2012/0023314 A1* | 1/2012 | Crum | G06F 9/3838 712/216 |
| 2014/0281431 A1* | 9/2014 | Iyengar | G06F 9/3838 712/226 |
| 2016/0179552 A1* | 6/2016 | Wong | G06F 9/3838 712/216 |
| 2022/0391214 A1* | 12/2022 | Eyole | G06F 9/30043 |

* cited by examiner

*Primary Examiner* — Shawn Doman
(74) *Attorney, Agent, or Firm* — Withrow & Terranova, PLLC

(57) ABSTRACT

Instruction scheduling in a processor using operation source parent tracking. A source parent is a producer instruction whose execution generates a produced value consumed by a consumer instruction. The processor is configured to track identifying operation source parent information for instructions processed in a pipeline and providing such operation source parent information to a scheduling circuit along with the associated consumer instruction. The scheduling circuit is configured to perform instruction scheduling using operation source parent tracking on received instruction(s) to be scheduled for execution. The processor is configured to compare sources and destinations for each of the instructions to be scheduled based on the operation source parent information to determine instructions ready for scheduling for execution. Given availability of the operation source parent information for instructions to be scheduled, the processor can perform a reduced number of comparisons of the sources and destinations for instructions to be scheduled.

20 Claims, 5 Drawing Sheets

INSTRUCTION SCHEDULING IN A PROCESSOR USING OPERATION SOURCE PARENT TRACKING

BACKGROUND

I. Field of the Disclosure

The technology of the disclosure relates generally to scheduling instructions in a microprocessor, and specifically to performing scheduling by tracking an execution pipeline with which a parent of a source for an operation is associated.

II. Background

As part of executing instructions, microprocessors may conventionally perform instruction scheduling, which means selecting specific instructions for execution in one or more execution pipelines of the microprocessor. "Instruction scheduling" and "instructions" can refer to architectural instructions, micro-operations, or any other type of operation which may be scheduled for execution by a scheduler. One conventional approach for instruction scheduling is to use out-of-order scheduling, in which the microprocessor may fetch instructions in the order in which they were generated by a compiler (i.e., in program or sequential order) but may select a next instruction to be executed from a group of instructions which have been fetched based on a variety of factors (e.g., age of instructions in the fetch group, whether an instruction has unresolved dependencies or hazards, etc.). The out-of-order approach may be relatively more complex from a hardware perspective, because performing the evaluation on the group of fetched instructions involves comparisons that the in-order scheduler need not perform. However, the out-of-order approach to instruction scheduling may provide relatively better performance of the microprocessor, as it can avoid stalling when a next sequential instruction is not ready for execution, but one or more "newer" instructions are ready for execution and could be scheduled while awaiting resolution of dependencies or hazards for the next sequential instruction.

Where instructions may be scheduled out-of-order for execution, it is desirable to have the largest-possible group of instructions from which to select a next instruction (sometimes referred to as "scheduler depth" or the "scheduler window"), as the larger the group of possible next instructions is, the less likely that none of them will be ready, and thus the likelihood that the microprocessor will stall is relatively less. Furthermore, increasing the size of the scheduler window of out-of-order instructions which may be scheduled may reduce the total time for a particular program to complete. At the same time, it may also be desirable to increase the number of total instructions that the scheduler may issue within a cycle (sometimes referred to as "scheduler width"). However, increasing both the depth and the width of the scheduler causes the number of comparisons per instruction to be scheduled to grow quadratically, as in conventional implementations, the total number of comparisons may be thought of as a product of the scheduler width and depth, and thus a linear increase in both width and depth causes a greater than linear increase in the overall number of comparisons. This may cause both a performance loss and an undesirable increase in the silicon area devoted to the comparison circuits involved in performing the comparisons.

SUMMARY OF THE DISCLOSURE

Aspects disclosed in the detailed description include instruction scheduling in a processor using operation source parent tracking. A source parent is a producer instruction whose execution generates a produced value that is consumed by a consumer instruction. In exemplary aspects, the processor is configured to track identifying operation source parent information for instructions processed in a pipeline and providing such operation source parent information to a scheduling circuit along with the associated consumer instruction. Parent information is information relating to a producer instruction whose execution generates a produced value that is consumed by a consumer instruction as a dependent instruction. The scheduling circuit is configured to perform instruction scheduling using operation source parent tracking on received instruction(s) to be scheduled for execution. The processor is configured to compare sources and destinations for instructions to be scheduled based on the operation source parent information to determine instructions ready for scheduling for execution. As a result of the availability of the operation source parent information for instructions to be scheduled, the processor may be able to perform a reduced number of comparisons of the sources and destinations for instructions to be scheduled. In some aspects, this may permit comparison circuitry in the processor to be physically smaller and to perform comparisons more quickly than conventional designs to mitigate or compensate for the increases in lane width and/or scheduler depth (i.e., largest-possible group of instructions from which to select a next instruction) of the scheduler circuit.

In this regard in one aspect, a processor for scheduling instructions is disclosed. The processor comprises a scheduling entry array circuit comprising a plurality of scheduling entries. Each scheduling entry is configured to store first operation source parent information. The processor also comprises a compare array circuit configured to receive the first operation source parent information from the scheduling entry array circuit and to perform a dependency comparison with a first source parent of a plurality of source parents based on the first operation source parent information.

In another aspect, a processor is disclosed. The processor comprises a means for storing scheduling entries comprising a plurality of scheduling entries. Each scheduling entry among the plurality of scheduling entries is configured to store first operation source parent information. The processor also comprises a means for receiving the first operation source parent information from the means for storing the scheduling entries. The processor also comprises a means for performing a dependency comparison with a first source parent of a plurality of source parents based on the first operation source parent information.

In yet another aspect, a method of tracking operation source parent information in a processor is disclosed. The method comprises establishing a first scheduler entry of a plurality of scheduler entries. The first scheduler entry comprises first source parent information. The method also comprises providing the first source parent information to a parent selection circuit. The method also comprises selecting a compare source parent from a plurality of source parents based on the first source parent information. The method also comprises performing a dependency comparison associated with the first scheduler entry using the compare source parent.

In yet another aspect, a non-transitory computer-readable medium stores computer executable instructions which, when executed by a processor, cause the processor to establish a first scheduler entry of a plurality of scheduler entries. The first scheduler entry comprises first source parent information. The instructions also cause the processor to provide the first source parent information to a parent selection circuit. The instructions also cause the processor to select a compare source parent from a plurality of source parents based on the first source parent information. The instructions also cause the processor to perform a dependency comparison associated with the first scheduler entry using the compare source parent.

DETAILED DESCRIPTION

Figure 1:
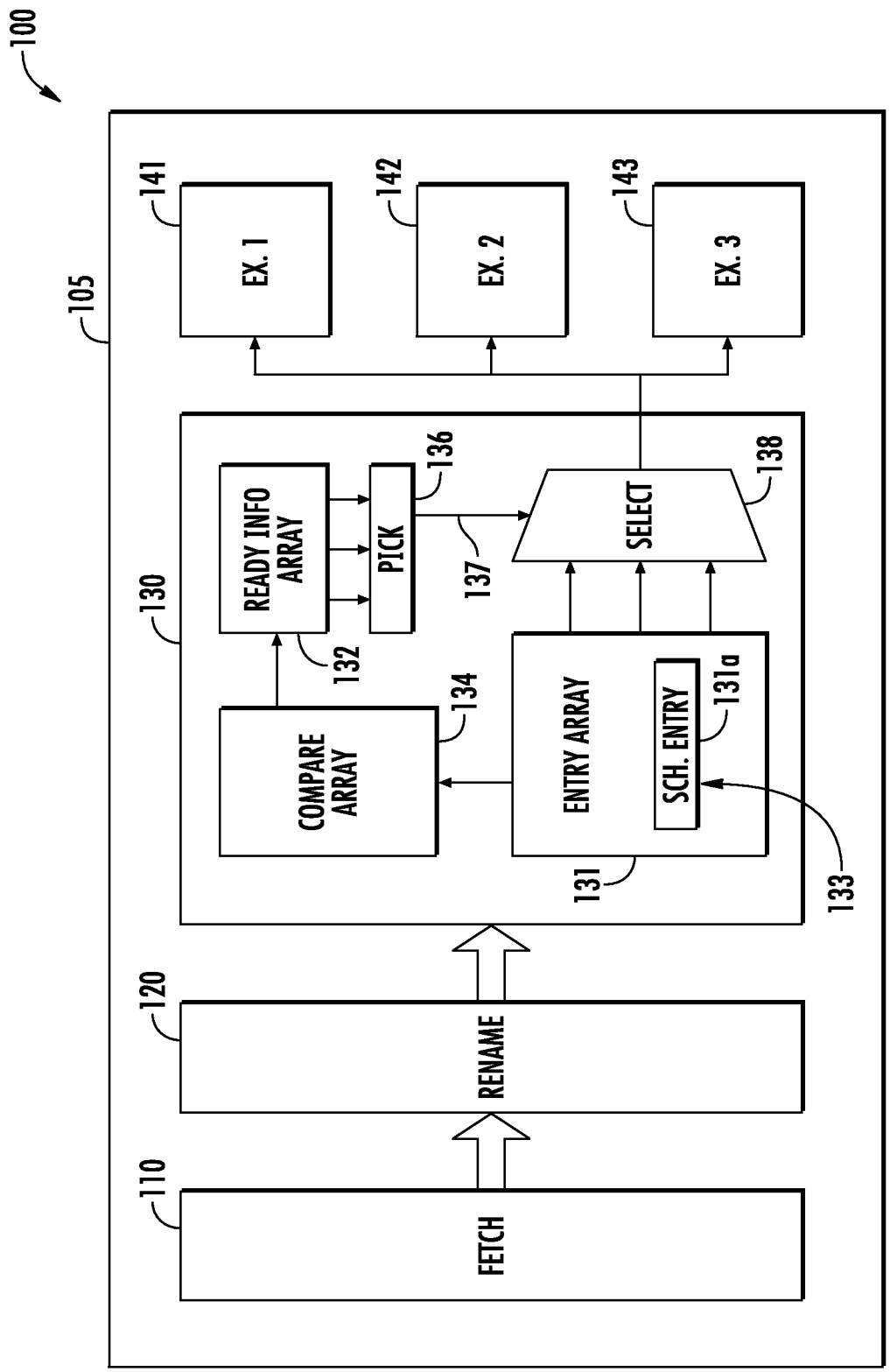
FIG. 1 is a block diagram of an exemplary processor configured to perform exemplary instruction scheduling using operation source parent tracking.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include instruction scheduling in a processor using operation source parent tracking. A source parent is a producer instruction whose execution generates a produced value that is consumed by a consumer instruction. In exemplary aspects, the processor is configured to track identifying operation source parent information for instructions processed in a pipeline and providing such operation source parent information to a scheduling circuit along with the associated consumer instruction. Parent information is information relating to a producer instruction whose execution generates a produced value that is consumed by a consumer instruction as a dependent instruction. The scheduling circuit is configured to perform instruction scheduling using operation source parent tracking on received instruction(s) to be scheduled for execution. The processor is configured to compare sources and destinations for each of the instructions to be scheduled based on the operation source parent information to determine instructions ready for scheduling for execution. As a result of the availability of the operation source parent information for instructions to be scheduled, the processor may be able to perform a reduced number of comparisons of the sources and destinations for each of the instructions to be scheduled. In some aspects, this may permit comparison circuitry in the processor to be physically smaller and to perform comparisons more quickly than conventional designs to mitigate or compensate for the increases in lane width and/or scheduler depth (i.e., largest-possible group of instructions from which to select a next instruction) of the scheduler circuit.

In this regard, FIG. 1 is a block diagram of a computer system 100 that includes a processor 105 configured to perform instruction scheduling using operation source parent tracking, as will be discussed in greater detail herein. The processor 105 includes a fetch circuit 110 coupled to a rename circuit 120. The fetch circuit 110 is configured to ay fetch instructions from a memory subsystem (which may include multiple levels of cache, main memory, and other types of memory known to those having skill in the art). The rename circuit 120 is configured to perform renaming on the fetched instructions before the fetched instructions are sent to be scheduled, which may include identifying operation source parent information for instructions to be scheduled, and providing such operation source parent information to a scheduling circuit 130 along with the associated instruction. Parent information is information relating to a producer instruction whose execution generates a produced value that is consumed by a consumer instruction as a dependent instruction. The rename circuit 120 is coupled to the scheduling circuit 130. The scheduling circuit 130 is configured to perform instruction scheduling using operation source parent tracking on instruction(s) received from the rename circuit 120, as will be discussed in greater detail herein. The scheduling circuit 130 may choose one or more instruction(s) from a plurality of instructions available to be scheduled and provides the chosen instruction(s) to one or more execution pipelines, such as a first execution pipeline 141, a second execution pipeline 142, and a third execution pipeline 143.

In this example, the scheduling circuit 130 further comprises a scheduling entry array circuit 131 which comprises a plurality of scheduling entries (such as scheduling entry 131a, for example), each configured to store information related to an instruction which has been received from the rename circuit 120. As will be discussed in greater detail herein, each scheduling entry in the scheduling entry array circuit 131 may contain associated operation source parent information 133 (which may, in an aspect, be provided by the rename circuit 120 at the time than an entry is established in the scheduling entry army circuit 131). The scheduling entry array circuit 131 is coupled to a compare array circuit 134 and to a selection circuit 138. As will be discussed in greater detail herein, the compare array circuit 134 may be configured to use the operation source parent information 133 received from the scheduling entry array circuit 131 to compare sources and destinations for each of the scheduling entries in the scheduling entry array circuit 131 to determine which entry or entries are ready for scheduling. The compare array circuit 134 is configured to perform dependency comparisons to determine which entry or entries are ready to be scheduled and provide information regarding any ready entries to the ready information array circuit 132. A picker circuit 136 is coupled to the ready information array circuit 132 and is configured to produce a selection control signal 137 by evaluating the information regarding ready entries in the ready information array circuit 132. The selection control signal 137 is provided to the selection circuit 138, which selects an instruction established in an entry of the scheduling entry array circuit 131 for scheduling on one of the execution pipelines 141-143.

The compare array circuit 134 may receive the operation source parent information 133 stored in each scheduling entry of the scheduling entry array circuit 131 (such as scheduling entry 131a), and may use the operation source parent information 133 to select a specific operation source parent (for example, a specific one of the execution pipelines 141-143) on which to perform dependency comparisons (i.e., instead of comparing all potential operation source parents for dependencies, the comparison can be focused on a specific source parent that is known to contain the dependency). As a result of the availability of the operation source parent information '133 in each scheduling entry of the scheduling entry array circuit 131, the compare array circuit 134 may have a reduced number of comparison circuits when contrasted with an otherwise-analogous compare array circuit in which specific operation source parent information 133 is unavailable, as will be illustrated in more detail with respect to FIGS. 4A and 4B. In some aspects, this may permit the compare array circuit 134 to be physically smaller and to perform comparisons more quickly than conventional designs, at the cost of the added storage in the scheduling entry array circuit 131.

Figure 2:
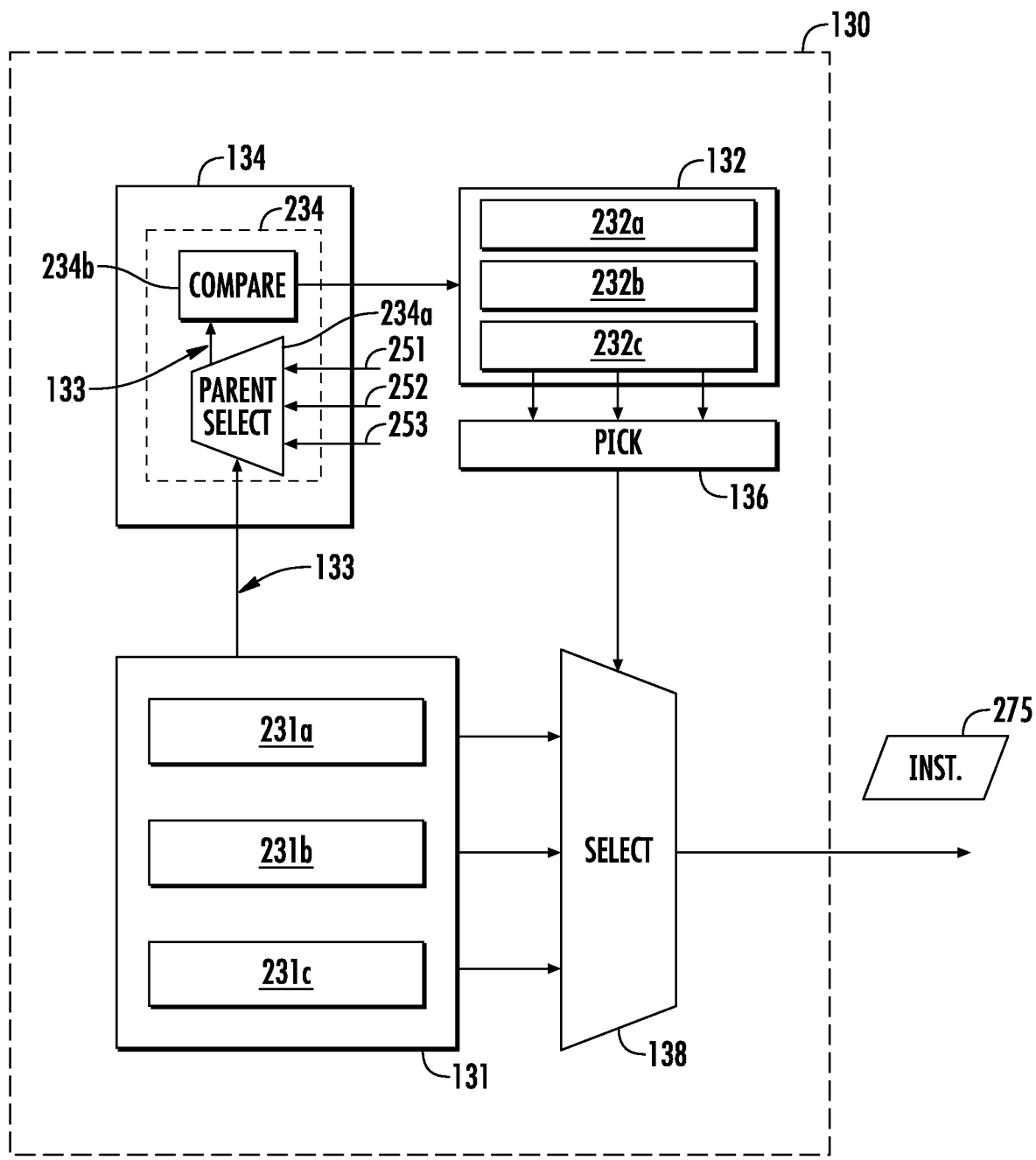
FIG. 2 is a detailed block diagram of the scheduling circuit in the processor of FIG. 1.

In this regard, FIG. 2 is a detailed block diagram of the scheduling circuit 130 of FIG. 1. In an illustrated aspect, the scheduling entry array circuit 131 has three scheduling entries 231a-231c, and each of the scheduling entries 231a-231c may contain information related to an instruction which has been received from the rename circuit 120, including operation source parent information 133 for that instruction. Those having skill in the art will recognize that the number of entries in the scheduling circuit 130 is a matter of design choice, and the illustrated aspect is provided merely by way of example and not limitation. As shown in FIG. 1, the processor 105 includes three parallel execution pipelines—the first execution pipeline 141, the second execution pipeline 142, and the third execution pipeline 143. Each execution pipeline provides respective source pipeline information such as first execution pipeline information 251, second execution pipeline information 252, and third execution pipeline information 253, to the compare array circuit 134 so that the compare array circuit 134 can perform dependency comparisons between the scheduling entries 231a-231c of the scheduling entry array circuit 131 and any pending operations in each of the execution pipelines 141-143. This is because the compare array circuit 134 must account for the possibility that, for a given instruction, its operation source parent(s) can be produced by any one of the first execution pipeline 141, second execution pipeline 142, or third execution pipeline 143. The operation source parent information 133 for each of the scheduling entries 231a-231c is provided to the compare array circuit 134, which may reduce the effective "width" of the compare array circuit 134 (i.e., the number of execution pipelines which must be checked as the possible producer of a source of a given instruction), since instead of needing to compare a source of a given instruction against each of the first, second, and third execution pipeline information 251-253, the operation source parent information 133 allows the compare array circuit 134 to compare a source of a given instruction only against the specific execution pipeline information indicated by the associated operation source parent information.

As illustrated in FIG. 2, the operation source parent information 133 for a particular instruction is provided to an individual compare circuit 234 of the compare array circuit 134. The compare array circuit 134 may comprise a plurality of such individual compare circuits 234, although only a single individual compare circuit 234 is illustrated for convenience of explanation. The individual compare circuit 234 receives the first, second, and third execution pipeline information 251-253 and the operation source parent information 133 for a particular instruction at a parent select circuit 234a. The operation source parent information 133 is used to select one of the first, second, or third execution pipeline information 251-253 to compare against a source of a given instruction. The selected information is provided to a comparison circuit 234b of the individual compare circuit 234 to determine if there is a dependency between a source of the particular instruction and the selected execution pipeline information.

The results of the comparisons performed by each individual compare circuit 234 are provided to an entry of the ready information army circuit 132 associated with the instruction associated with the particular individual compare circuit 234. For example, scheduling entry 231a is associated with ready information array entry 232a, scheduling entry 231b is associated with ready information array entry 232b, and scheduling entry 231c is associated with ready information array entry 232c. Where at least one comparison associated with a particular scheduling entry shows an unresolved dependency, the associated ready information array entry may indicate that the particular scheduling entry is not ready for scheduling. Where all the comparisons associated with a particular scheduling entry show that no unresolved dependencies exist, the associated ready information array entry may indicate that the particular scheduling entry is ready for scheduling. For those ready information array entries that are ready for scheduling, they may be evaluated by the picker circuit 136 to select an associated scheduling entry for scheduling by the selection circuit 138.

As will be appreciated by those having skill in the art, the dependency comparisons performed by the individual compare circuits 234 of the compare array circuit 134 may be performed at different times. For example, at the time when one of the scheduling entries 231a-231c is established (i.e., a new instruction and source parent information is written into that entry), the individual compare circuits 234 that are associated with the newly-established entry may perform dependency comparisons to determine if the entry is ready to be scheduled, or it if still has one or more unresolved dependencies. Further, a dependency comparison may be performed by the individual compare circuits 234 that are associated with one of the possible source parents (i.e., an instruction associated with another of the scheduling entries 231a-231c) when that instruction has been completed, as this may permit scheduling entries for which the completed instruction was an unresolved dependency to be ready for scheduling.

Figure 3:
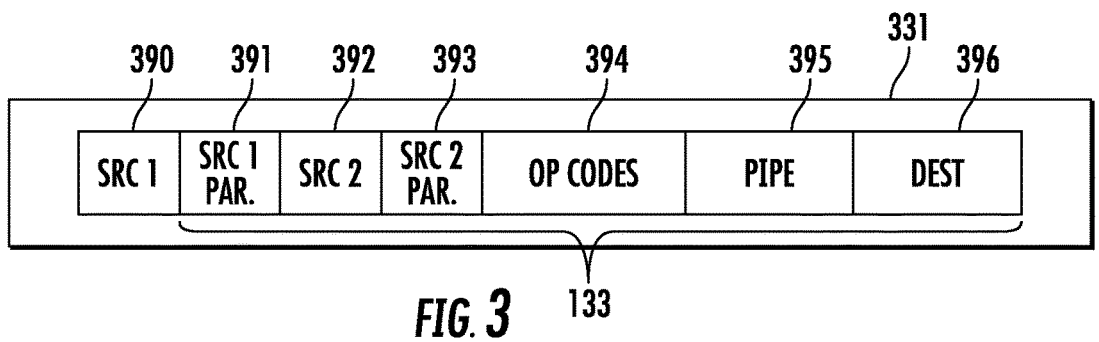
FIG. 3 is a detailed block diagram of an exemplary scheduling entry.

FIG. 3 is a detailed block diagram of an exemplary scheduling entry 331, which in some aspects may correspond to the scheduler entry 131a of FIG. 1 or the scheduling entries 231a-231c of FIG. 2. In an aspect, the scheduling entry 331 may store information associated with a specific instruction such as source(s) such as a first source 390 and a second source 392, destination(s) such as a destination 396, op codes such as op codes 394, execution pipeline assignment information 395, and other information which will allow a processor core of which the scheduling entry 331 is a part to execute the instruction associated with the scheduling entry 331. As described above, the scheduling entry 331 may further include operation source parent fields to store operand source parent information 133 such as first source parent information 391 and second source parent information 393 that may be provided to a compare array circuit, so that only the specific operation source parent associated with a specific source of the scheduling entry 331 may be used for dependency comparisons related to the scheduling entry 331.

Those having skill in the art will appreciate that the number of source, operation source parent, and destination fields is influenced by the characteristics of the instructions (and instruction set) that may be executed by the processor core of which the scheduling entry 331 is a part. For example, in the illustrated aspect, the scheduling entry 331 may be a part of a processor core executing an instruction set where instructions may have zero, one, or two sources, and zero or one destinations, and thus the scheduling entry 331 includes two source (and associated operation source parent) fields and one destination field. However, in another aspect, where an instruction set associated with a processor core of which the scheduling entry 331 is a part contains some instructions with three sources, and some instructions with two destinations, the scheduling entry 331 may include a third source, third source parent, and second destination field. In some aspects, some or all of the operation source parent fields (such as the first source parent information 391 and the second source parent information 393) may be unused (e.g., if the associated instruction for a particular scheduling entry has fewer than the maximum permissible number of source(s) for that instruction set). In order to account for this possibility, in some aspects, this may be accomplished by use of a particular value that may be written into the operation source parent field(s) of the respective source that is not included in a particular instruction. This value may be identified in a compare array circuit such as compare array circuit 134, and may be used to suppress comparisons related to that source, force the result of the comparisons related to that source to a result indicating that no dependency exists, or other ways of accounting for instructions with less than the maximum permissible number of sources as will be known by those having skill in the art. In other aspects, information regarding unused source(s) for a particular scheduling entry may be provided to an associated compare array circuit such as compare array circuit 134 separately.

Figure 4A:
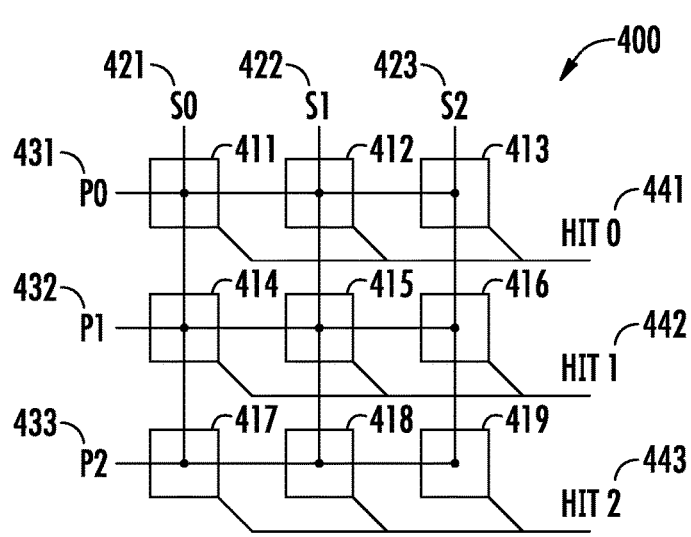
FIG. 4A is a block diagram of an exemplary conventional compare array circuit.
Figure 4B:
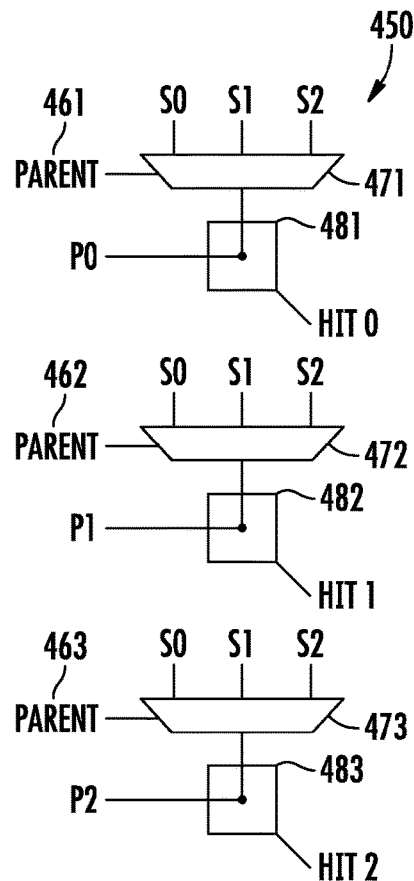
FIG. 4B is a block diagram of an exemplary compare array circuit according to aspects presented herein.

In order to illustrate the difference between a conventional implementation of a compare array circuit for performing dependency comparisons and a compare array circuit that provides for selection of an operation source parent, FIG. 4A is a block diagram of an exemplary conventional compare array circuit 400, and FIG. 4B is a block diagram of a compare array circuit 450 that provides for selection of an operation source parent, such as compare array circuit 134. For purposes of comparison, both the conventional compare array circuit 400 and the compare array circuit 450 include a first source parent 421, a second source parent 422, and a third source parent 423 (which may correspond to information being produced by the first execution pipeline 141, the second execution pipeline 142, and the third execution pipeline 143, for example). Further, both the conventional compare array circuit 400 and the compare array circuit 450 include a first producer 431, a second producer 432, and a third producer 433, which are to be compared against the source parent(s). The producers 431-433 may be destinations of other entries in an associated scheduling entry array, such as scheduling entry array circuit 131.

In the conventional compare array circuit 400, because the identity of the specific operation source parent is not tracked, each possible producer is compared against each possible operation source parent. Thus, compare circuits 411, 412, and 413 compare the first producer 431 with each of the source parents 421-423 to produce a first producer hit signal 441, compare circuits 414, 415, and 416 compare the second producer 432 with each of the source parents 421-423 to produce a second producer hit signal 442, and compare circuits 417, 418, and 419 compare the third producer 433 with each of the source parents 421-423 to produce a third producer hit signal 443. As can be appreciated, this compare array circuit is with respect to a single source from a single scheduling entry—each source would have a similar associated compare array circuit. It can also be appreciated that increasing the number of possible source parents (i.e., increasing the scheduler width) by one and increasing the number of potential producers (i.e., increasing the scheduler depth) by one would cause the number of compare circuits to grow from nine (411-419) to sixteen.

However, in the compare array circuit 450 according to an exemplary aspect, each producer 431-433 is associated with a selection circuit 471-473 and a single compare circuit 481-483. Each selection circuit 471-473 receives an operation source parent select information 461-463, which may correspond to information store in the operation source parent field of an exemplary scheduling entry 331. In contrast to the conventional compare array circuit 400, the compare array circuit 450 performs a selection of the specific source parent of the source parents 421-423 identified as the operation source parent in the operation source parent field of an associated scheduling entry 331, and then performs a single comparison between the selected source parent and the respective producer 431-433 to generate each of the respective producer hit signals 441-443. As can be appreciated, the selection circuits 471-473 may be increased in width as the scheduler width increases (as a matter of design choice), while retaining a single compare circuit per producer (in the illustrated example). As discussed above, this constrains the growth in physical size of the scheduler as width increases, which may provide performance, area, and power benefits in some aspects—in keeping with the previous example, with respect to the compare array circuit 450, increasing both the scheduler width and depth by one in this case results in the addition of one extra selection circuit, one extra compare circuit, and a slight increase in the size of each compare circuit to account for the extra source parent input.

Figure 5:
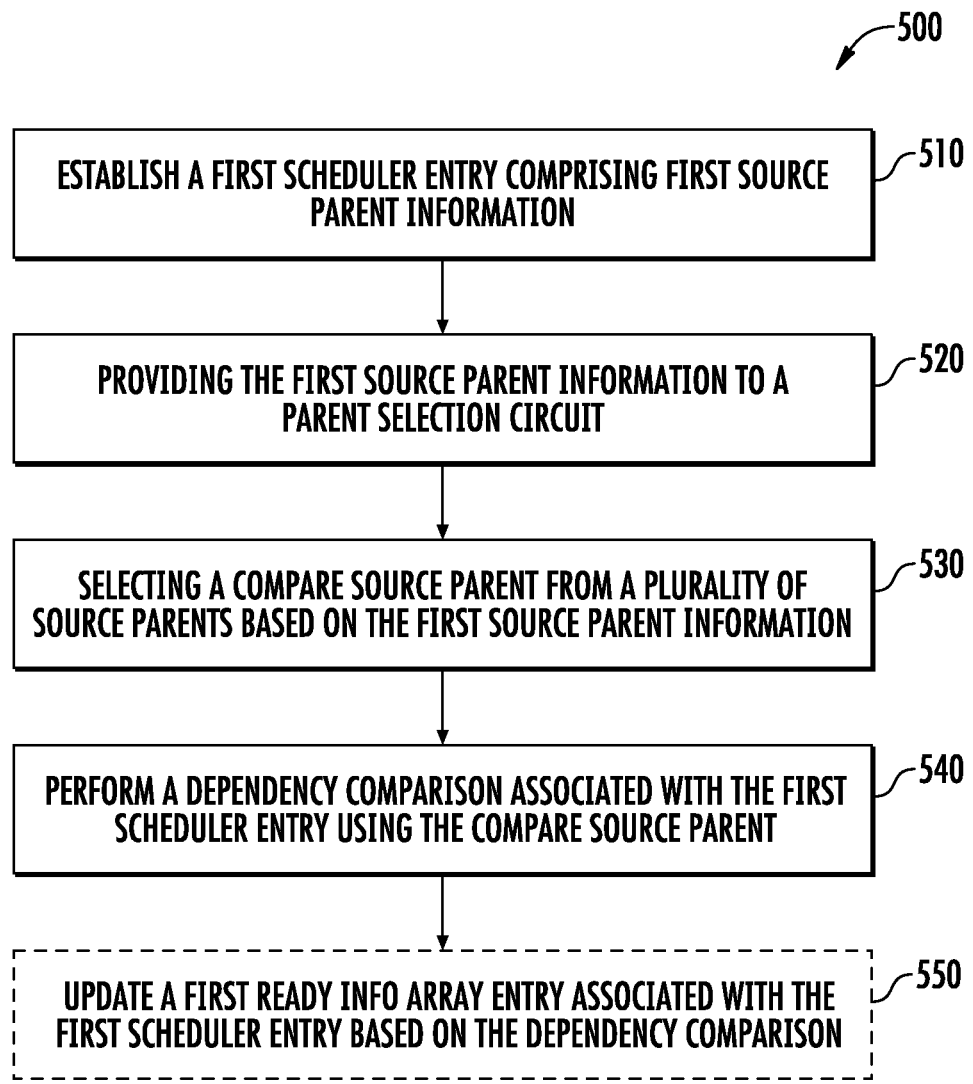
FIG. 5 is a block diagram of an exemplary method for performing instruction scheduling using operation source parent tracking.

FIG. 5 is a block diagram of a method 500 for performing scheduling using operation source parent tracking according to an aspect. The method may be performed by the scheduling circuit 130 of FIG. 1, for example. The method begins at block 510 by establishing a first scheduler entry comprising first source parent information. For example, as discussed above, the rename circuit 120 may establish an entry such as scheduling entry 131*a* or 231*a-c* with first source parent information in a first source parent field such as first source parent information 391 of FIG. 3. The method continues at block 520 by providing the first source parent information to a parent selection circuit. For example, an entry such as scheduling entries 231*a-c* may provide source parent information stored in a source parent field of the scheduling entry 231*a-c* to the parent select circuit 234*a* of the compare array circuit 134.

The method continues in block 530 by selecting a compare source parent from a plurality of source parents based on the first source parent information. For example, the parent select circuit 234*a* may use source parent information from one of the scheduling entries 231*a-c* to select one of the first, second, or third execution pipeline information 251-253 as the compare source parent. The method continues in block 540 by performing a dependency comparison associated with the first scheduling entry using the compare source parent. For example, the comparison circuit receives the compare source parent from the parent select circuit 234a, and performs a dependency comparison associated with the particular scheduling entry 231a-c associated with the first source parent. In some aspects, this dependency comparison may be performed when the entry is first established in the scheduling entry array to determine if the entry is ready for scheduling, or if it has unresolved dependencies. Further, the dependency comparison may be performed for an entry or entries which have unresolved dependencies each time another operation (which may be associated with a source parent) is completed (i.e., a potential dependency resolves because the potential source parent operation is finished and the result of that operation, which was the cause of the dependency, is now available).

The method continues in block 550 by updating a first ready information array entry associated with the first scheduling entry based on the dependency comparison. For example, one of the ready information array entries 232a-c may be updated as either ready or not ready based on the dependency comparison of the associated scheduling entry 231a-c and associated first source parent.

The exemplary processor that can perform scheduling using operation source parent tracking according to aspects disclosed herein and discussed with reference to FIGS. 1-5 may be provided in or integrated into any processor-based device. Examples, without limitation, include a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 6:
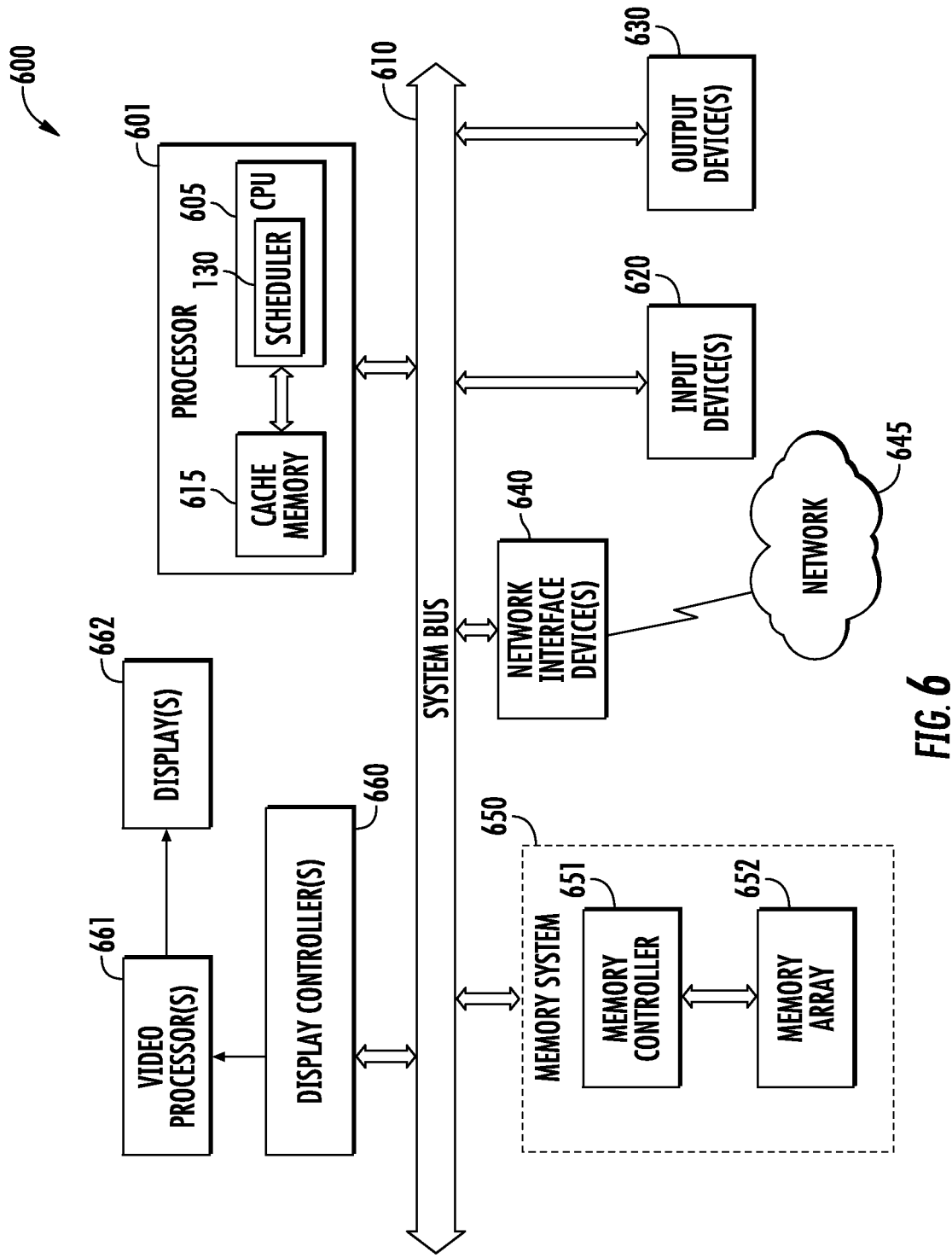
FIG. 6 is a block diagram of an exemplary processor-based system including a processor that can include the scheduling circuit in FIGS. 1 and 2 and can be configured to perform instruction scheduling using operation source parent tracking.

In this regard, FIG. 6 illustrates an example of a processor-based system 600 that can perform scheduling using operation source parent tracking as illustrated and described with respect to FIGS. 1-5. In this example, the processor-based system 600 includes a processor 601 having one or more central processing units (CPUs) 605, each including one or more processor cores, and which may correspond to the processor 105 of FIG. 1, and as such may include the scheduler circuit 130, which may be configured to perform scheduling using operation source parent tracking as illustrated and described with respect to FIGS. 1-5. The CPU(s) 605 may be an initiator device. The CPU(s) 605 is coupled to a system bus 610 and can intercouple initiator and target devices included in the processor-based system 600. As is well known, the CPU(s) 605 communicates with these other devices by exchanging address, control, and data information over the system bus 610. For example, the CPU(s) 605 can communicate bus transaction requests to a memory controller 651 as an example of a target device. Although not illustrated in FIG. 6, multiple system buses 610 could be provided, wherein each system bus 610 constitutes a different fabric.

Other initiator and target devices can be connected to the system bus 610. As illustrated in FIG. 6, these devices can include a memory system 650, one or more input devices 620, one or more output devices 630, one or more network interface devices 640, and one or more display controllers 660, as examples. The input device(s) 620 can include any type of input device, including, but not limited to, input keys, switches, voice processors, etc. The output device(s) 630 can include any type of output device, including, but not limited to, audio, video, other visual indicators, etc. The network interface device(s) 640 can be any devices configured to allow exchange of data to and from a network 645. The network 645 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 640 can be configured to support any type of communications protocol desired. The memory system 650 can include the memory controller 651 coupled to one or more memory arrays 652.

The CPU(s) 605 may also be configured to access the display controller(s) 660 over the system bus 610 to control information sent to one or more displays 662. The display controller(s) 660 sends information to the display(s) 662 to be displayed via one or more video processors 661, which process the information to be displayed into a format suitable for the display(s) 662. The display(s) 662 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The initiator devices and target devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A processor for scheduling instructions, comprising:
a scheduling entry array circuit comprising a plurality of scheduling entries, each scheduling entry configured to store first operation source parent information; and
a compare array circuit configured to:
receive the first operation source parent information from the scheduling entry array circuit; and
perform a dependency comparison with a first source parent of a plurality of source parents based on the first operation source parent information;
wherein:
each of the plurality of source parents is associated with an execution pipeline of a plurality of execution pipelines; and
the processor is configured to perform the dependency comparison by being configured to:
select, using the first operation source parent information, an associated execution pipeline from among the plurality of execution pipelines on which to perform the dependency comparison;
select, using the first operation source parent information, information from the associated execution pipeline; and
perform the dependency comparison only against the information from the associated execution pipeline.

2. The processor of claim 1, further comprising a ready information array circuit comprising a plurality of ready entries, each ready entry associated with a scheduling entry, and each ready entry configured to store dependency information associated with the scheduling entry, and to update the dependency information based on the dependency comparison.

3. The processor of claim 2, wherein each ready entry is configured to indicate:
the associated scheduling entry is not ready for scheduling when the stored dependency information includes at least one unresolved dependency; and
the associated scheduling entry is ready for scheduling when the stored dependency information includes no unresolved dependencies.

4. The processor of claim 3, further comprising a picker circuit configured to indicate a scheduling entry of the plurality of scheduling entries for scheduling by a selection circuit based on at least one ready entry indicating no unresolved dependencies.

5. The processor of claim 4, further comprising the selection circuit responsive to the picker circuit and configured to provide a scheduling entry to one of the plurality of execution pipelines based on the indication from the picking circuit.

6. The processor of claim 1, further comprising a rename circuit configured to provide the first operation source parent information associated with a first instruction.

7. The processor of claim 1, wherein each scheduling entry is configured to store a plurality of operation source parent information including the first operation source parent information.

8. The processor of claim 1, wherein the compare array circuit is configured to provide an indication that no dependency exists when the first operation source parent information indicates that a first operation source parent is unused.

9. The processor of claim 1, integrated into an integrated circuit (IC).

10. The processor of claim 1, further integrated into a device selected from the group consisting of: a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

11. A processor, comprising:
a means for storing scheduling entries comprising a plurality of scheduling entries, each scheduling entry among the plurality of scheduling entries configured to store first operation source parent information;

a means for receiving the first operation source parent information from the means for storing the scheduling entries; and a means for performing a dependency comparison with a first source parent of a plurality of source parents based on the first operation source parent information;

wherein:

each of the plurality of source parents is associated with an execution pipeline of a plurality of execution pipelines; and the means for performing the dependency comparison comprises:

a means for selecting, using the first operation source parent information, an associated execution pipeline from among the plurality of execution pipelines on which to perform the dependency comparison;

a means for selecting, using the first operation source parent information, information from the associated execution pipeline; and a means for performing the dependency comparison only against the information from the associated execution pipeline.

12. The processor of claim 11, further comprising a means for storing ready information comprising a plurality of ready entries, each ready entry associated with a scheduling entry, and each ready entry configured to store dependency information associated with the scheduling entry, and to update the dependency information based on the dependency comparison.

13. A method of tracking operation source parent information in a processor, comprising:

establishing a first scheduler entry of a plurality of scheduler entries, the first scheduler entry comprising first operation source parent information;

providing the first operation source parent information to a parent selection circuit;

selecting a compare source parent from a plurality of source parents based on the first operation source parent information, wherein each of the plurality of source parents is associated with an execution pipeline of a plurality of execution pipelines; and performing a dependency comparison associated with the first scheduler entry using the compare source parent;

wherein performing the dependency comparison comprises:

selecting, using the first operation source parent information, an associated execution pipeline from among the plurality of execution pipelines on which to perform the dependency comparison;

selecting, using the first operation source parent information, information from the associated execution pipeline; and performing the dependency comparison only against the information from the associated execution pipeline.

14. The method of claim 13, further comprising updating first dependency information in a first ready information array entry of a plurality of ready information array entries, the first ready information array entry associated with the first scheduler entry, based on the dependency comparison.

15. The method of claim 14, further comprising selecting the first scheduler entry for scheduling on an execution pipeline of the plurality of execution pipelines based on the first dependency information in the first ready information array entry indicating that no unresolved dependencies exist.

16. The method of claim 13, further comprising receiving the first operation source parent information from a rename circuit.

17. The method of claim 13, wherein the dependency comparison is performed in response to establishing the first scheduler entry.

18. The method of claim 13, wherein the dependency comparison is performed in response to an operation corresponding to a source parent of the plurality of source parents being completed.

19. A non-transitory computer-readable medium having stored thereon computer executable instructions which, when executed by a processor, cause the processor to:

establish a first scheduler entry of a plurality of scheduler entries, the first scheduler entry comprising first operation source parent information;

provide the first operation source parent information to a parent selection circuit;

select a compare source parent from a plurality of source parents based on the first operation source parent information, wherein each of the plurality of source parents is associated with an execution pipeline of a plurality of execution pipelines; and perform a dependency comparison associated with the first scheduler entry using the compare source parent;

wherein the computer executable instructions cause the processor to perform the dependency comparison by causing the processor to:

select, using the first operation source parent information, an associated execution pipeline from among the plurality of execution pipelines on which to perform the dependency comparison;

select, using the first operation source parent information, information from the associated execution pipeline; and perform the dependency comparison only against the information from the associated execution pipeline.

20. The non-transitory computer-readable medium of claim 19, further having stored thereon computer executable instructions which, when executed by a processor, cause the processor to update first dependency information in a first ready information array entry of a plurality of ready information array entries, the first ready information array entry associated with the first scheduler entry, based on the dependency comparison.

* * * * *